United States Patent [19]

Toyama et al.

[11] Patent Number: 5,122,961
[45] Date of Patent: Jun. 16, 1992

[54] NAVIGATION APPARATUS FOR VEHICLE

[75] Inventors: Yasuhiro Toyama; Takashi Yamada, both of Anjo, Japan

[73] Assignees: Aisin Aw Co., Ltd.; Kabushiki Kaisha Shinsangyokaihatsu, Japan

[21] Appl. No.: 408,487
[22] PCT Filed: Dec. 23, 1988
[86] PCT No.: PCT/JP88/01305
§ 371 Date: Aug. 23, 1989
§ 102(e) Date: Aug. 23, 1989
[87] PCT Pub. No.: WO89/06345
PCT Pub. Date: Jul. 13, 1989

[30] Foreign Application Priority Data

Dec. 28, 1987 [JP] Japan ............... 62-333051

[51] Int. Cl.⁵ ................................ G06F 15/50
[52] U.S. Cl. ................... 364/449; 364/424.01; 364/565; 340/995
[58] Field of Search .......... 364/561, 565, 424.01, 364/424.05, 443, 449, 571.05; 324/160–161; 340/990, 995

[56] References Cited

U.S. PATENT DOCUMENTS

| | | | |
|---|---|---|---|
| 4,176,397 | 11/1979 | Crom et al. | 364/561 |
| 4,371,935 | 2/1983 | Yamaki | 364/561 X |
| 4,459,667 | 7/1984 | Takeuchi | 364/449 X |
| 4,507,737 | 3/1985 | La Sarge et al. | 364/453 |
| 4,665,497 | 5/1987 | Yamamura et al. | 364/561 |
| 4,682,287 | 7/1987 | Mizuno et al. | 364/561 |
| 4,710,888 | 12/1987 | Burke et al. | 364/561 |
| 4,758,959 | 7/1988 | Thoone et al. | 364/454 |
| 4,788,645 | 3/1988 | Zavoli et al. | 364/449 |

FOREIGN PATENT DOCUMENTS 58-97560 7/1983 Japan.
61-66921 4/1986 Japan.

Primary Examiner—Thomas G. Black
Attorney, Agent, or Firm—Lorusso & Loud

[57] ABSTRACT

A navigation apparatus for a vehicle includes a vehicle speed sensor (1-a) for detecting an actual vehicle speed, an odometer (1-b) for detecting a travel distance of the vehicle, a processing unit (5) for calculating a present position from the detection signals from the vehicle speed sensor and the odometer, and a display means for displaying the calculated present position on a map displayed. The actual vehicle speed is compared with an angular velocity of the wheel obtained by the odometer (1-b), and, only when the difference between the actual vehicle speed and the angular velocity of the wheel exceeds a predetermined value, the travel distance is calculated using the actual vehicle speed. The actual vehicle speed sensor (1-a) may include two photosensors. The vehicle speed is operated using the degree of coincidence of the two waveforms. Furthermore, the travel distance is calculated after the vehicle has travelled a fixed distance or for a fixed period of time.

4 Claims, 6 Drawing Sheets

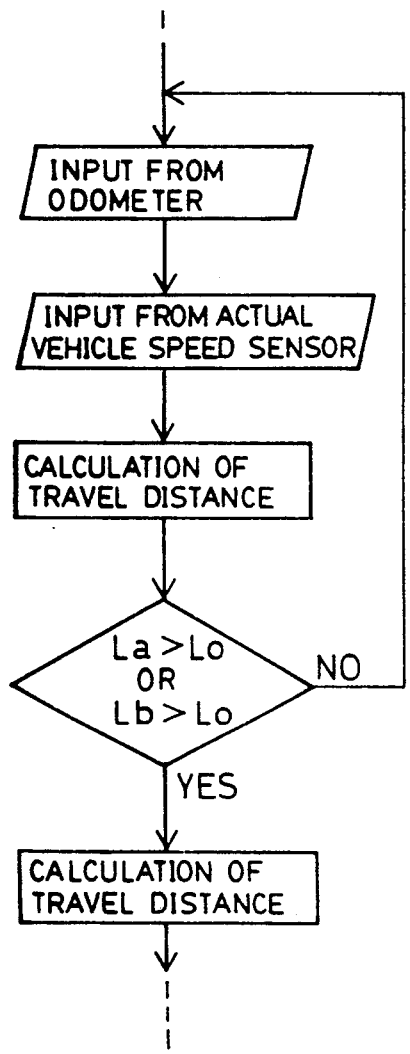
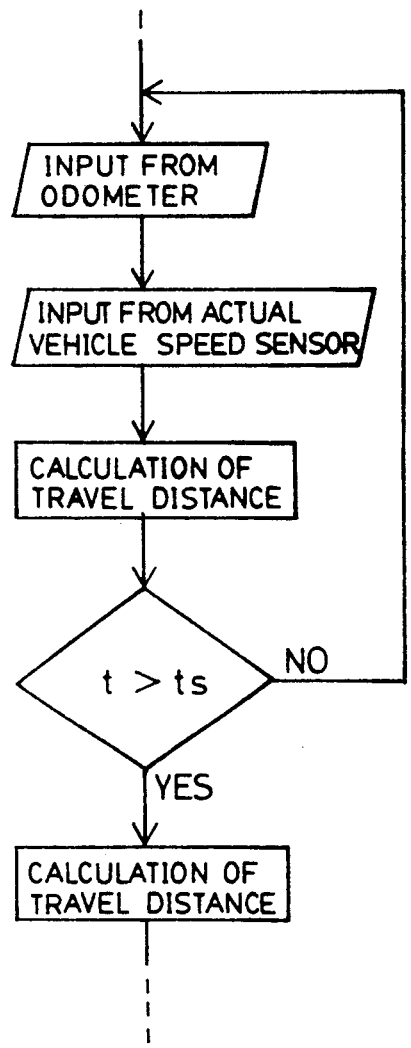
FIG. 6(a)
FIG. 6(b)
La : TRAVEL DISTANCE OBTAINED FROM THE ACTUAL VEHICLE SPEED SENSOR
Lb : TRAVEL DISTANCE OBTAINED FROM T/M
Lo : CONSTANT OR THE DISTANCE BETWEEN INTERSECTIONS
t : TIME
ts : CONSTANT FIG. 8
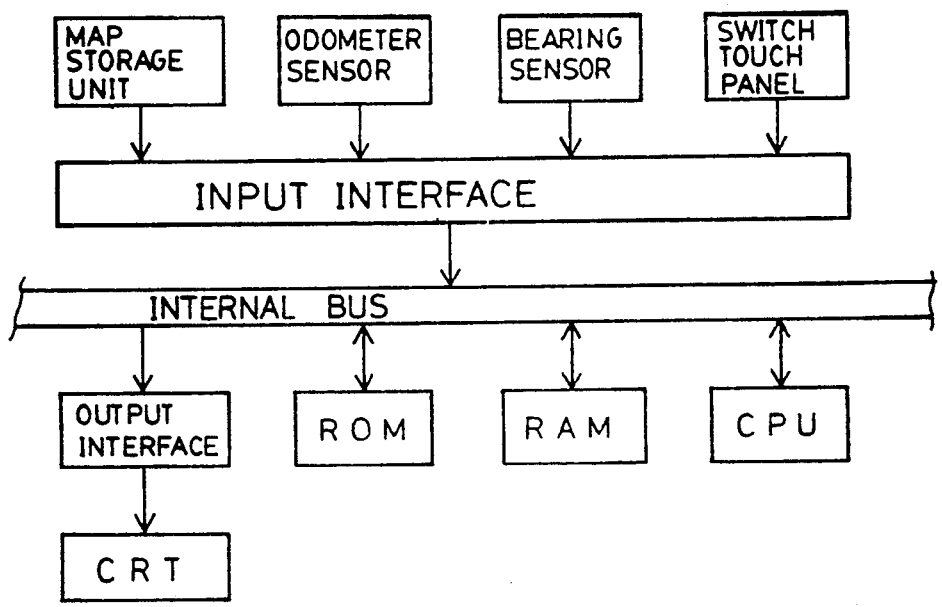
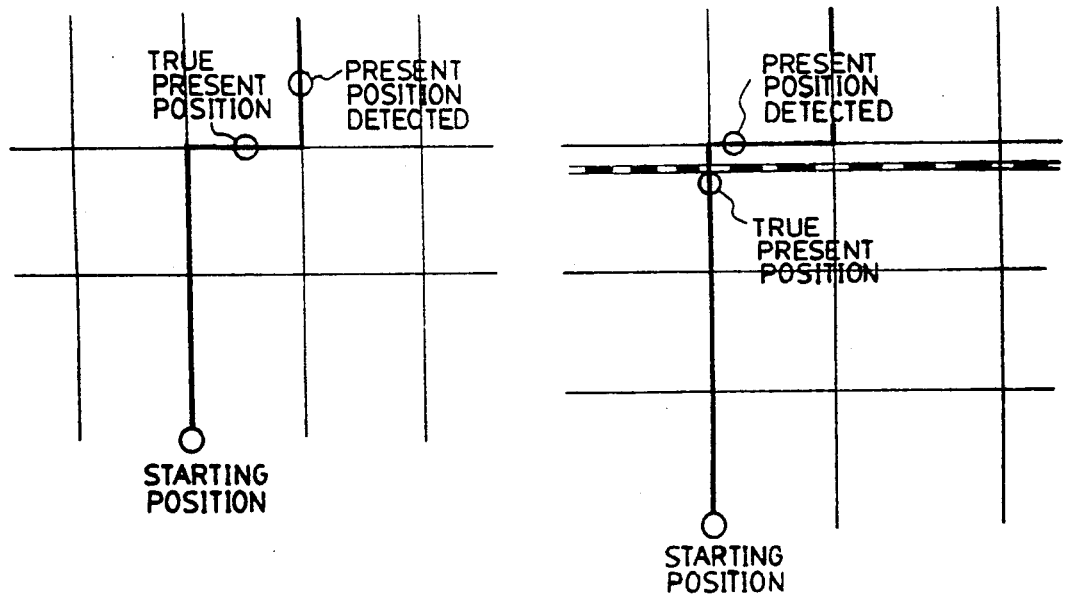
FIG. 9
FIG. 10

NAVIGATION APPARATUS FOR VEHICLE

TECHNICAL FIELD

The present invention relates to a navigation apparatus for a vehicle of the type which navigates a vehicle on a predetermined course and which enables a correct present position to be obtained on the course on a map.

BACKGROUND ART

Navigation apparatuses for a vehicle have been known, which include an odometer for detecting the distance over which a vehicle travels, a bearing sensor for detecting the direction of progress of a vehicle, and a map storage device. Such a navigation apparatus is capable of only displaying the present position of the vehicle on the map image read from the map storage device.

FIG. 8 shows the configuration of the above-described conventional navigation apparatus for a vehicle. The navigation apparatus includes a map storage device 1, an odometer 2, a bearing sensor 3, a switch and a touch panel 4, an input interface 5, an internal bus 6, a central processing unit 7, a RAM 8, a ROM9, an output interface 10, and a CRT 11.

The map storage device 1 which stores map data may be in the form of a video disk, a video tape, CDROM or the like. Map data on a desired area in the map data stored in the map storage device is read out and displayed on the CRT 11. The odometer 2 generates distance data for unit distance. The bearing sensor 3 generally generates bearing data by detecting the geomagnetic bearing corresponding to the direction of progress of the vehicle. The distance over which the vehicle travels after it has left the starting point and the direction in which the vehicle travels or as to whether or not the vehicle turns right or left are detected by a combination of the odometer 2 and the bearing sensor 3. The CPU calculates the present position of the vehicle on a predetermined course using the measured data, and displays the obtained data on the map. A driver inputs data such as a destination, enlargement of the map and so on through the switch and touch panel 4 when the navigation is to be started so as to input the destination, the present position of the vehicle and so on in the RAM 8. The touch panel may be provided on the screen of the CRT 11. When the driver selectively touches a desired touch area in a plurality of touch areas, a corresponding signal is generated. The input interface 5 is a signal converter through which the input from the sensors, the storage device and the switches are sent to the internal bus 6. The ROM 9 stores programs for inputting/outputting the various types of data through the input interface 5, the output interface 10 and the internal bus 6, as well as those for processing the data. The programs are executed by the CPU 7.

The odometer of the type which detects the angular velocity of the wheel or the rotational speed of a transmission is known. Thus, in the conventional navigation system, the distance through which the vehicle travels is detected by detecting the angular velocity of the wheel or the rotational speed of the transmission. This method ensures an accurate detection of the travel distance, because the accurate radius of the wheel can be obtained. However, it has an disadvantage that, when a vehicle skids, e.g., when the vehicle goes round a sharp curve, is braked suddenly or travels on a graveled road, an accurate travel distance cannot be obtained. It is also a common practice to calculate the travel distance using the vehicle speed detected by the vehicle speed sensor. This method is advantageous in that the distance over which the vehicle actually travels can be obtained regardless of the skid of the vehicle. However, the maximum correlation value is calculated, and this does not ensure a very accurate detection of the travel distance as obtained by means of the odometer, increasing the measurement errors when the vehicle travels at a high speed.

These result in the erroneous detection of a present position T on a course as a present position M, as shown in FIGS. 9 and 10.

An object of the present invention is to provide a navigation apparatus which is designed to eliminate the aforementioned problems of the prior art, and which enables an accurate travel distance detection and hence an accurate present position detection.

DISCLOSURE OF INVENTION

To this end, the present invention provides a navigation apparatus for a vehicle which comprises a vehicle speed sensor for detecting an actual vehicle speed, an odometer for detecting a travel distance of the vehicle, a processing means for calculating a present position from the detection signals from the vehicle speed sensor and the odometer, and a display means for displaying the calculated present position on a map displayed. The present invention is characterized in that the actual vehicle speed is compared with the angular velocity of the wheel obtained by the odometer, and in that, only when the difference between the actual vehicle speed and the angular velocity of the wheel exceeds a predetermined value, the travel distance is calculated using the actual vehicle speed.

Thus, in the present invention, when the vehicle is not skidding, the travel distance is calculated from the angular velocity of the wheel. However, when the vehicle is skidding, the actual vehicle speed is used to calculate the travel distance. In consequence, an accurate travel distance can be obtained, thereby enabling an accurate present position to be detected.

BRIEF DESCRIPTION OF DRAWINGS

FIGS. 6 and 7 are flowcharts of the processing executed to calculate a travel distance;

FIG. 8 is a block diagram of a conventional navigation apparatus for a vehicle; and FIGS. 9 and 10 illustrate the problem of the prior art.

BEST MODE FOR CARRYING OUT THE INVENTION

Figure 1:
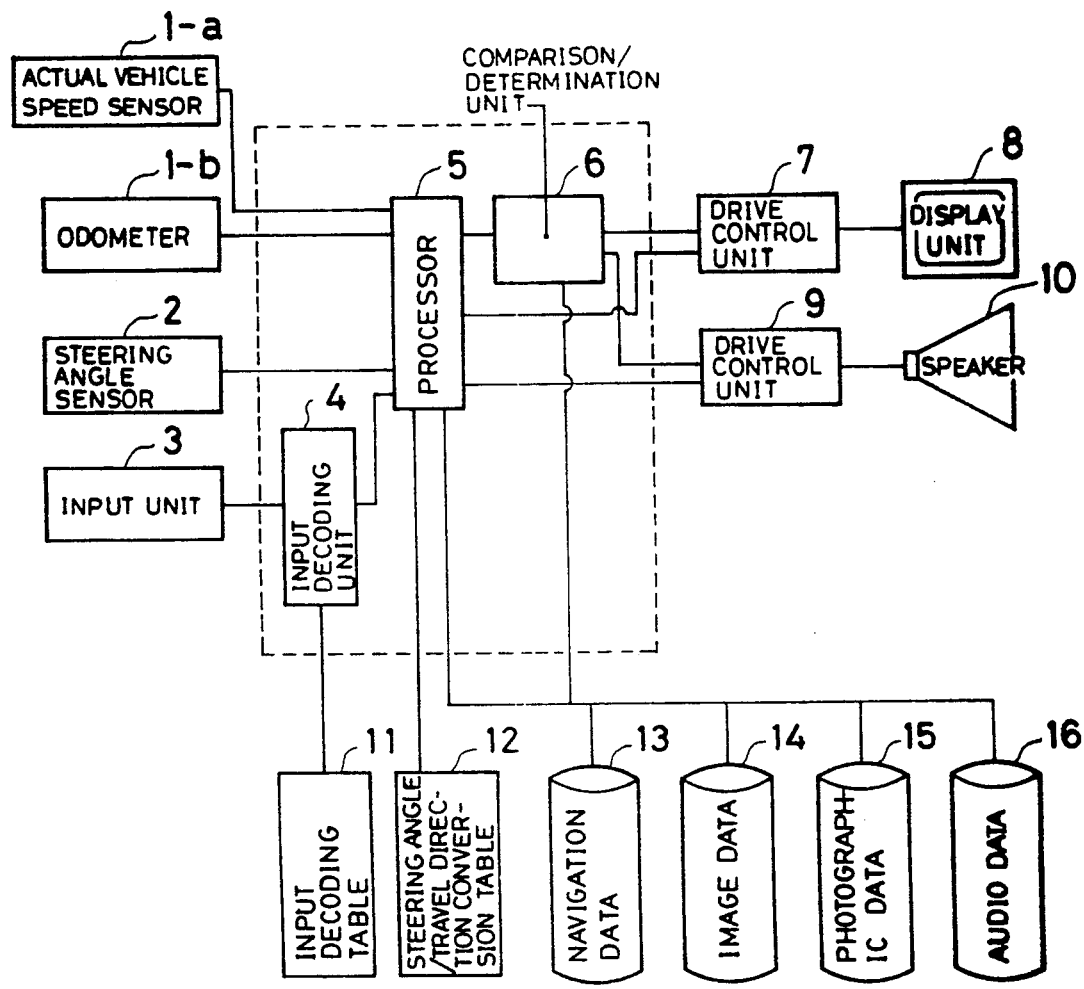
FIG. 1 is a block diagram of a navigation apparatus for a vehicle, showing an embodiment of the present invention.

An embodiment of the present invention will be described below with reference to the accompanying drawings. Referring first to FIG. 1 which is a block diagram of a navigation apparatus for a vehicle according to the present invention, the apparatus includes an actual vehicle speed sensor 1-a, an odometer 1-b, a steering angle sensor 2, an input unit 3, an input decoding unit 4, a processing unit 5, a comparison/determination unit 6, a drive control unit 7, a display unit 8, a drive control unit 9, a speaker 10, an input decoding table 11, a steering angle/travel direction conversion table 12, a navigation data file 13, an image data file 14, a photographic data file 15, and an audio data file 16.

The actual vehicle speed sensor 1-a, which is described in detail later and which is the characteristics of the present invention, detects the actual travel distance. The odometer 1-b measures the travel distance of the vehicle by detecting, for example, the rotational speed of the output shaft of a transmission, the angular velocity of the wheel or the like. The steering angle sensor 2 determines whether or not the vehicle makes a turn at an intersection. It may be an optical rotation sensor, a rotation resistance volume or the like, which is mounted on the rotational portion of a steering wheel. It may also be an angle sensor mounted on a wheel. The input unit 3 may be a joy stick, keys or a touch panel. Alternatively, data may be input from the display screen using keys or menus displayed on the screen of the display unit 8.

The input decoding unit 4 decodes the data input from the input unit 3 with reference to the input decoding table 11. For example, when the present position or the destination is input in the form of codes or characters to set a course, the input decoding unit 4 converts the codes or the characters which are input into present position data or the destination data by referring to the input decoding table 11. Hence, the input decoding table 11 is set in accordance with the data which is input from the input unit 3.

The processing unit 5 is the center of the navigation apparatus. Once the course is set from the input unit 3, the processing unit 5 reads in the navigation program for that course which is stored in the navigation data file 13 and executes it. In the individual navigation programs, the guide map is displayed on the screen of the display unit 8, the characteristic photographies of the intersections or the features on the course are output, or the remaining distance to an intersection or other guide data is displayed and at the same time aurally output from the speaker 10, as the vehicle advances the course. The map data, the photography data and the aural data which are used in the navigation programs are respectively stored in the files 14 to 16. In this navigation system, when the driver inputs from the input unit 3 the present position and the destination and then selects the course before he or she starts the vehicle, the processing unit 5 reads in the navigation program in the course which corresponds to the selected course and executes it.

Upon receipt of the detection signals from the actual vehicle speed sensor 1-a, the odometer 1-b and the steering angle sensor 2, the processing unit 5 calculates the change in the direction in which the vehicle travels with reference to the steering angle/travel direction conversion table 12. The steering angle/travel direction conversion table contains data representing the changes in the direction of travel per unit distance which correspond to the detected steering angles. The processing unit 5 calculates how much the direction of travel of the vehicle changes using the table when a steering wheel is turned. The comparison/determination unit 6 then compares the calculated change in the direction of travel with the angle at which the roads intersect at the intersection at which the vehicle is to make a turn, i.e., with the direction in which the vehicle is to travel, to determine whether or not the difference between these two values exceeds a predetermined value. It is determined that the vehicle turned the intersection where it should make a turn if the difference obtained is within the predetermined value. If the difference exceeds the predetermined value, it is determined that the vehicle turned the wrong intersection, and the result is displayed by the display unit 8 or aurally output from the speaker 10.

Next, how the vehicle speed is detected by the actual vehicle speed sensor 1-a will be described below with reference to FIGS. 2 to 5.

Figure 2:
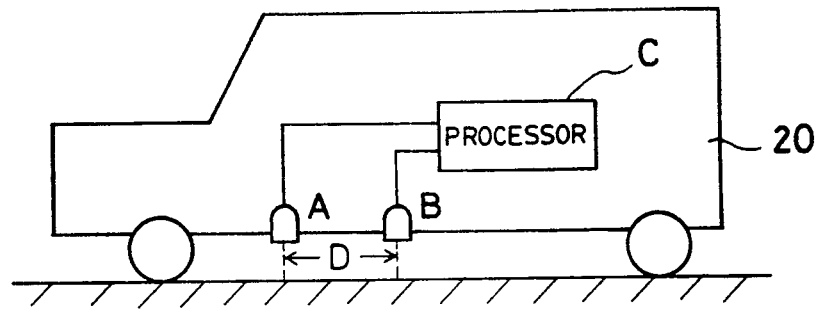
FIG. 2 shows a vehicle speed sensor mounted on a vehicle.

As shown in FIG. 2, two photo sensors A and B are mounted on the bottom of the floor of a vehicle 20 in such a manner that they are separate from each other by an interval D and that they face the surface of a road. Each of the photosensors A and B includes a light-receiving element and a light-emitting element. The waveform signals representing the lights reflected by the surface of the road are sent to a processing unit C so as to detect the actual vehicle speed. The processing unit C utilizes the fact that the waveforms of the lights reflected by different road surfaces differ from each other and thereby operates how many seconds have passed by the time when the waveform detected by the photosensor A coincides with that detected by the photosensor B.

Figure 3:
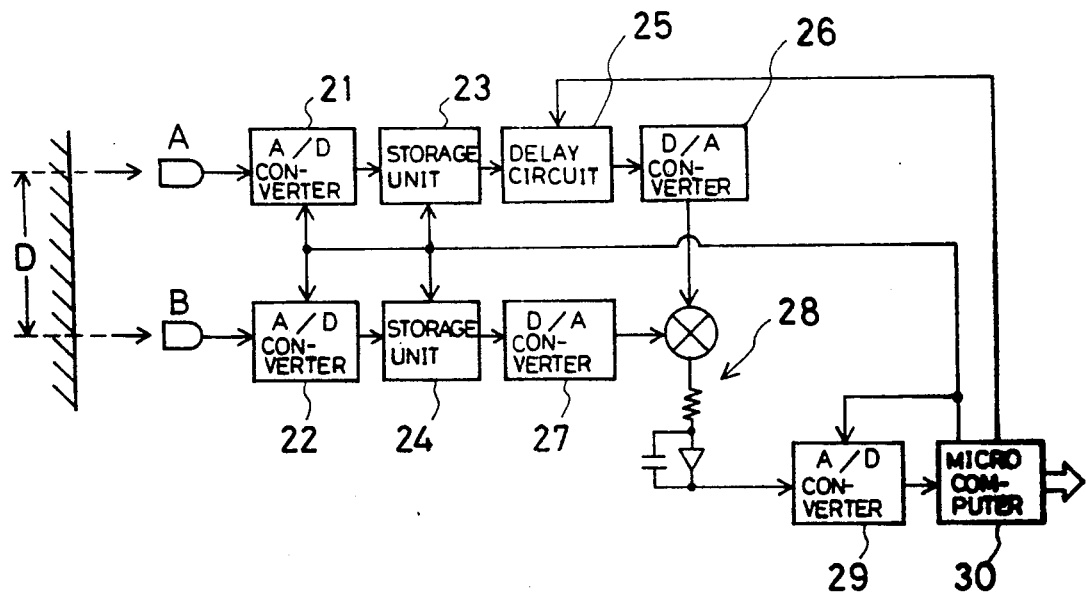
FIG. 3 is a block diagram of a control system for operating an actual vehicle speed.

As shown in FIG. 3, in the processing unit C, the waveform signals detected by the photosensors A and B are respectively converted into digital data by A/D converters 21 and 22, and the converted data is respectively stored in storage units 23 and 24. One of the waveform signals is passed through a delay circuit 25 and the delayed signal is output to a D/A converter 26. The other waveform signal is output to a D/A converter 27. Subtraction is performed on the two waveform signals by means of a comparator 28, and the resultant signal is sent to a microcomputer 30 through an A/D converter 29. In order to obtain the waveforms which lasts for a fixed time, the microcomputer 30 sends a control signal to the A/D converters 21 and 22 and the storage units 23 and 24. It also sends to the delay circuit 25 a delay signal to delay the waveform detected by the photosensor A by a fixed time, $\Delta T_d$.

Figure 4:
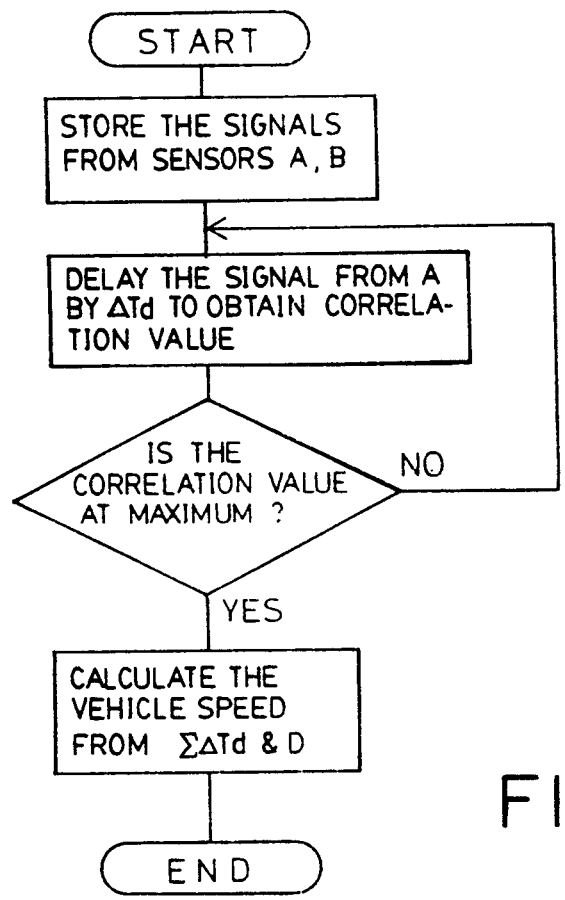
FIG. 4 is a flowchart of the processing of the actual vehicle speed.
Figure 5:
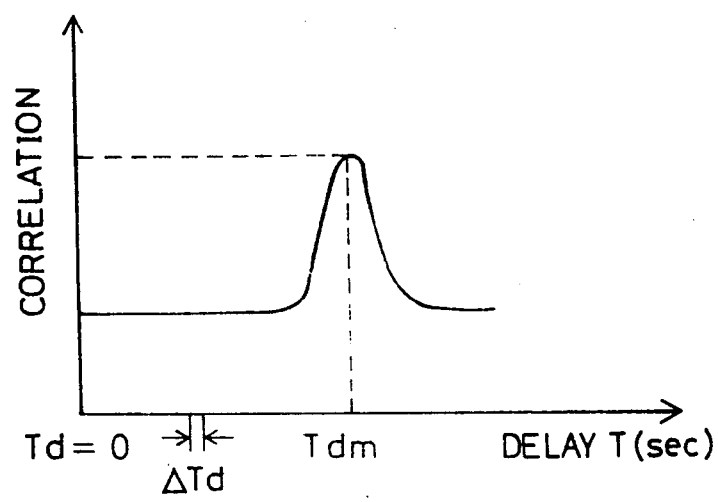
FIG. 5 is a graph, explaining the processing of the actual vehicle speed.

As shown in FIG. 4, the processing unit C stores the signals detected by the sensors A and B, delays the signal from the sensor A by $\Delta T_d$ and calculates the correlation value representing whether or not the waveform of the sensor A coincides with that of the sensor B. Thereafter, the process in which the signal is delayed by $\Delta T_d$ is repeated until the correlation value becomes maximum, as shown in FIG. 5. The vehicle speed is detected from the delay $T_{dm} = \Sigma \Delta T_d$ obtained when the correlation value is maximized, as well as from the interval D.

Next, the distance calculation method adopted in the present invention will be described below with reference to FIG. 6. In the example shown in FIG. 6 (a), the signal from the odometer 1-b and the signal from the actual vehicle sensor 1-a are input, and the travel distance $L_a$ is calculated from the actual vehicle speed obtained by the actual vehicle speed sensor. Next, the travel distance $L_a$ obtained on the basis of the actual vehicle speed or the travel distance $L_b$ obtained on the basis of the odometer is compared with the constant or the distance $L_0$ between the intersections. If $L_a > L_0$ or $L_b > L_0$, the travel distance is calculated. In the example shown in FIG. 6 (b), after a predetermined period of time has elapsed, the travel distance is calculated.

Figure 7:
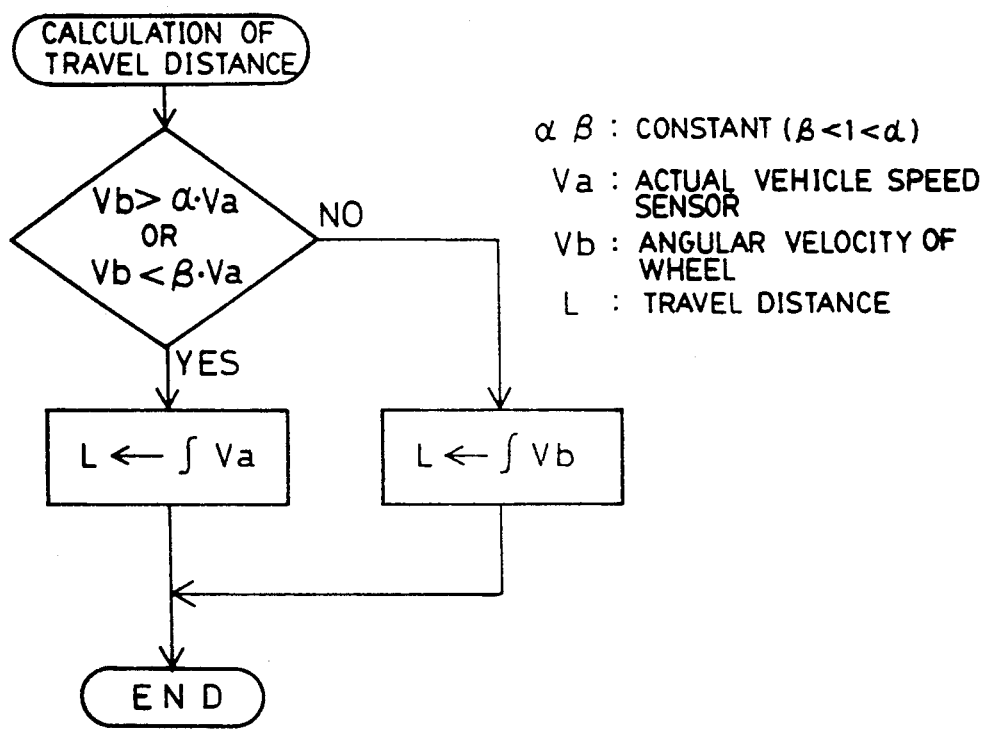

FIG. 7 is a flowchart of the travel distance calculation processing. First, the actual vehicle speed $V_a$ obtained by the actual vehicle speed sensor is compared with the angular velocity $V_b$ of the wheel obtained by the odometer. If $V_a$ differs $V_b$ by a large degree, it is determined that the vehicle is skidding, and the travel distance L is calculated using the actual vehicle speed $V_a$. If $V_a$ and $V_b$ do not differ largely, the travel distance L is calculated using the angular velocity $V_b$ of the wheel. These alleviate the burden on the microcomputer for calculating the actual vehicle speed.

The present invention is not limited to the above-described embodiment but various alterations are possible. For example, the actual vehicle speed sensor may be of the type in which an acceleration is detected and in which the detected acceleration is integrated twice.

Thus, in the present invention, even when the vehicle skids, an accurate present position can be detected.

What is claimed is:

1. A navigation apparatus for a vehicle, comprising:
    a vehicle speed sensor for detecting an actual vehicle speed and generating a vehicle speed detection signal;
    an odometer for detecting angular wheel speed and generating an angular wheel speed signal;
    comparing means for comparing said actual vehicle speed with said angular wheel speed detected by said odometer and for determining when the difference between said actual vehicle speed and the angular wheel speed exceeds a predetermined value;
    processing means for calculating a travel distance and a present position from the detection signals from said vehicle speed sensor and said odometer and, when the difference between said actual vehicle speed and the angular wheel velocity is determined to exceed the predetermined value, calculating a present position based on said vehicle speed detection signal alone; and
    display means for displaying the calculated present position on a map.

2. A navigation apparatus for a vehicle according to claim 1, wherein said vehicle speed sensor includes two photosensors, the vehicle speed being calculated using a degree of coincidence of two waveforms.

3. A navigation apparatus for a vehicle according to claim 1, wherein the calculation of the travel distance is preformed after the vehicle has travelled a fixed distance or for a fixed period of time.

4. A navigation apparatus for a vehicle according to claim 1 wherein said present position is calculated based on said angular wheel speed signal alone when said difference is determined to be less than said predetermined value.

* * * * *